US012677125B2

(12) United States Patent
Banks et al.

(10) Patent No.: US 12,677,125 B2
(45) Date of Patent: Jul. 7, 2026

(54) NATURAL LANGUAGE PROCESSING FOR ROADSIDE ASSISTANCE

(71) Applicant: Allstate Insurance Company, Northbrook, IL (US)

(72) Inventors: Anthony Banks, Matthews, NC (US); Todd Bucco, Lake Villa, IL (US); Brandon Tarvin, Upatoi, GA (US)

(73) Assignee: Allstate Insurance Company, Northbrook, IL (US)

( * ) Notice: Subject to any disclaimer, the term of this patent is extended or adjusted under 35 U.S.C. 154(b) by 406 days.

(21) Appl. No.: 18/209,118

(22) Filed: Jun. 13, 2023

(65) Prior Publication Data
US 2024/0422521 A1 Dec. 19, 2024

(51) Int. Cl.
*H04W 4/90* (2018.01)
*G10L 15/18* (2013.01)
*G06F 3/16* (2006.01)

(52) U.S. Cl.
CPC .......... *H04W 4/90* (2018.02); *G10L 15/1822* (2013.01); *G06F 3/167* (2013.01)

(58) Field of Classification Search
CPC ....... H04W 4/90; G10L 15/1822; G06F 3/167
See application file for complete search history.

(56) References Cited

U.S. PATENT DOCUMENTS

| | | | | |
|---|---|---|---|---|
| 7,269,253 | B1 * | 9/2007 | Wu ..................... | H04M 3/5233 |
| | | | | 379/265.11 |
| 8,259,911 | B1 * | 9/2012 | Trandal ............... | H04M 3/5166 |
| | | | | 379/88.19 |
| 2001/0040887 | A1 * | 11/2001 | Shtivelman ......... | H04M 3/5237 |
| | | | | 370/352 |
| 2017/0324867 | A1 * | 11/2017 | Tamblyn ............. | H04L 65/1093 |
| 2019/0325868 | A1 * | 10/2019 | Lecue ..................... | G10L 25/63 |
| 2021/0272183 | A1 * | 9/2021 | Turnbull ............ | G06Q 30/0613 |

* cited by examiner

*Primary Examiner* — Farid Seyedvosoghi

(57) ABSTRACT

Implementations claimed and described herein provide systems and methods for submitting a roadside assistance request. The systems and methods use natural language communication to determine an intent. The intent is determined by the system and used to generate and submit the roadside assistance request.

20 Claims, 4 Drawing Sheets

NATURAL LANGUAGE PROCESSING FOR ROADSIDE ASSISTANCE

FIELD

Aspects of the presently disclosed technology relate generally to systems and methods of analyzing voice data to identify a need for roadside assistance and providing roadside assistance. More specifically, aspects of this disclosure relate to systems and methods for processing roadside assistance requests received from a user using a natural language interface.

BACKGROUND

A vehicle failure can happen unexpectedly and may be a difficult problem to solve for the driver of the vehicle. Before the proliferation of computers and computerized devices, an individual would likely directly interact with businesses to arrange for roadside assistance, such as towing services, flat tire assistance, fuel services, automobile repairs, oil changes, and scheduled maintenance appointments, etc., through various interfaces requiring some sort of physical interaction, such as face-to-face conversation, a phone conversation, and/or the like.

However, having enough call-center staff to answer phone calls from consumers without long wait times is expensive and requires a lot of training for staff. As such, calls for roadside assistance communicated by conventional systems do not effectively process roadside assistance requests due to long wait times and/or ineffective staff. It is with these observations in mind, among others, that various aspects of the present disclosure were conceived and developed.

SUMMARY

Implementations described and claimed herein address the foregoing problems by providing systems and methods for performing natural language processing for roadside assistance requests. For instance, a computer implemented method can comprise: receiving a phone call from a telephone device; generating a greeting for communication to a user via the telephone device; retrieving one or more of a policy and benefits associated with the user; receiving voice inputs from the user via the telephone device; determining intent based on the voice inputs; determining a car location; determining if enough information has been collected to submit a roadside assistance request, wherein: if enough information has not been collected, transfer the phone call to a live agent, and if enough information has been collected, submit the roadside assistance request to a benefit provider system to cause roadside assistance to be provided to the user.

In some implementations, a system comprises a natural language processing platform comprising one or more processors configured to: receive a phone call from a telephone device; generate a greeting for communication to a user via the telephone device; retrieve one or more of a policy and benefits associated with the user; receive voice inputs from the user in response to the greeting; determine intent based on the voice inputs; determine a car location; determine if enough information has been collected to submit a roadside assistance request, wherein: if enough information has not been collected, transfer the phone call to a live agent associated with a call center system, and if enough information has been collected, submit the roadside assistance request to a benefit provider system to cause roadside assistance to be provided to the user.

In some instances, one or more tangible non-transitory computer-readable storage media store computer-executable instructions for performing a computer process on a computing system, the computer process comprising: receiving a phone call from a telephone device; generating a greeting for communication to a user via the telephone device; retrieving one or more of a policy and benefits associated with the user; receiving voice inputs from the user via the telephone device; determining intent based on the voice inputs; determining a car location; determining car details based on one or more of the voice inputs and the policy; determining if a tow is needed based on the voice inputs; determining a tow location if the tow is needed; determining if enough information has been collected to submit a roadside assistance request, wherein: if enough information has not been collected, transfer the phone call to a live agent, and if enough information has been collected, submit the roadside assistance request to a benefit provider system to cause roadside assistance to be provided to the user.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
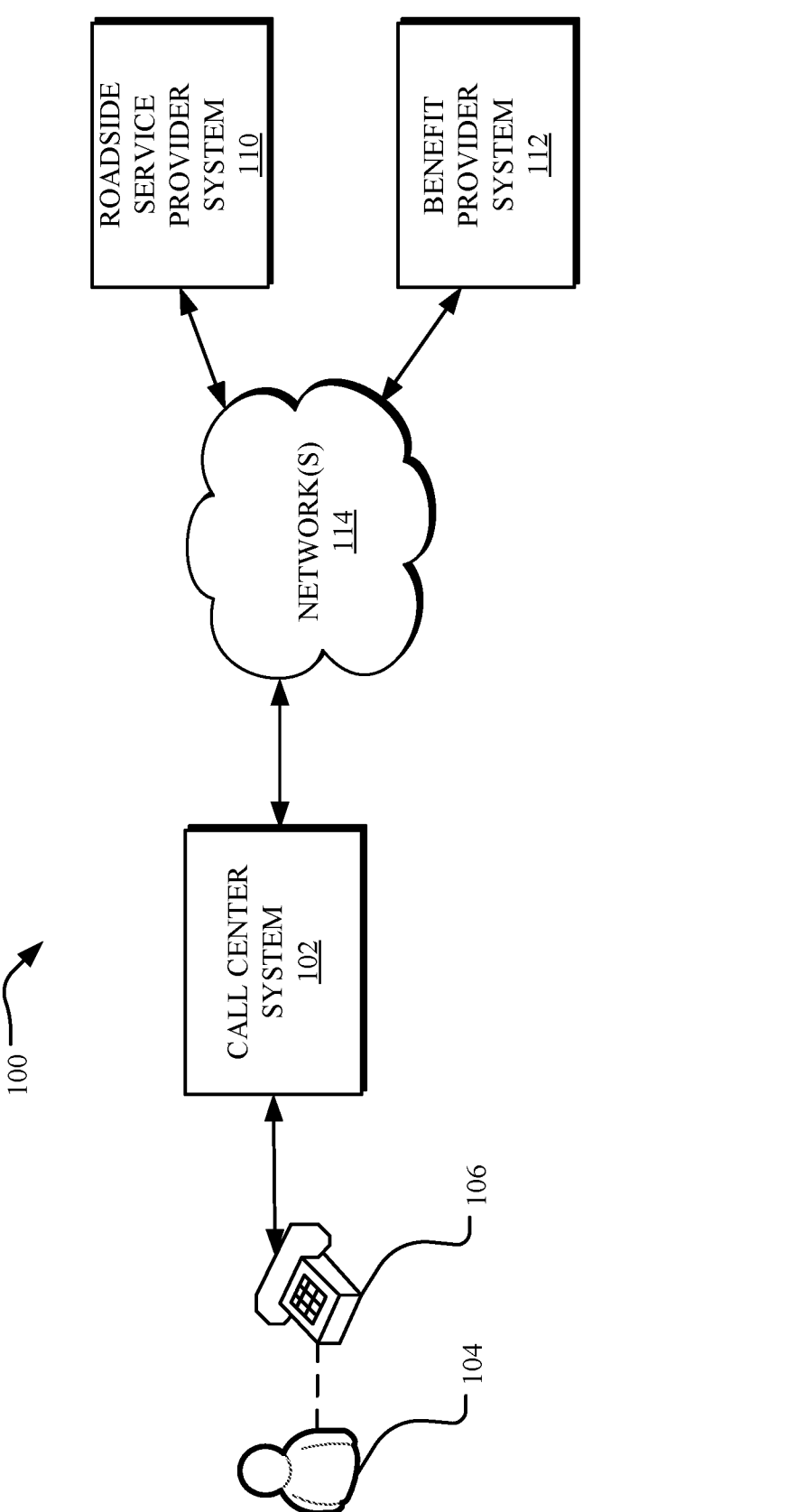
FIG. 1 illustrates an example system to process a request to provide roadside assistance.
Figure 2:
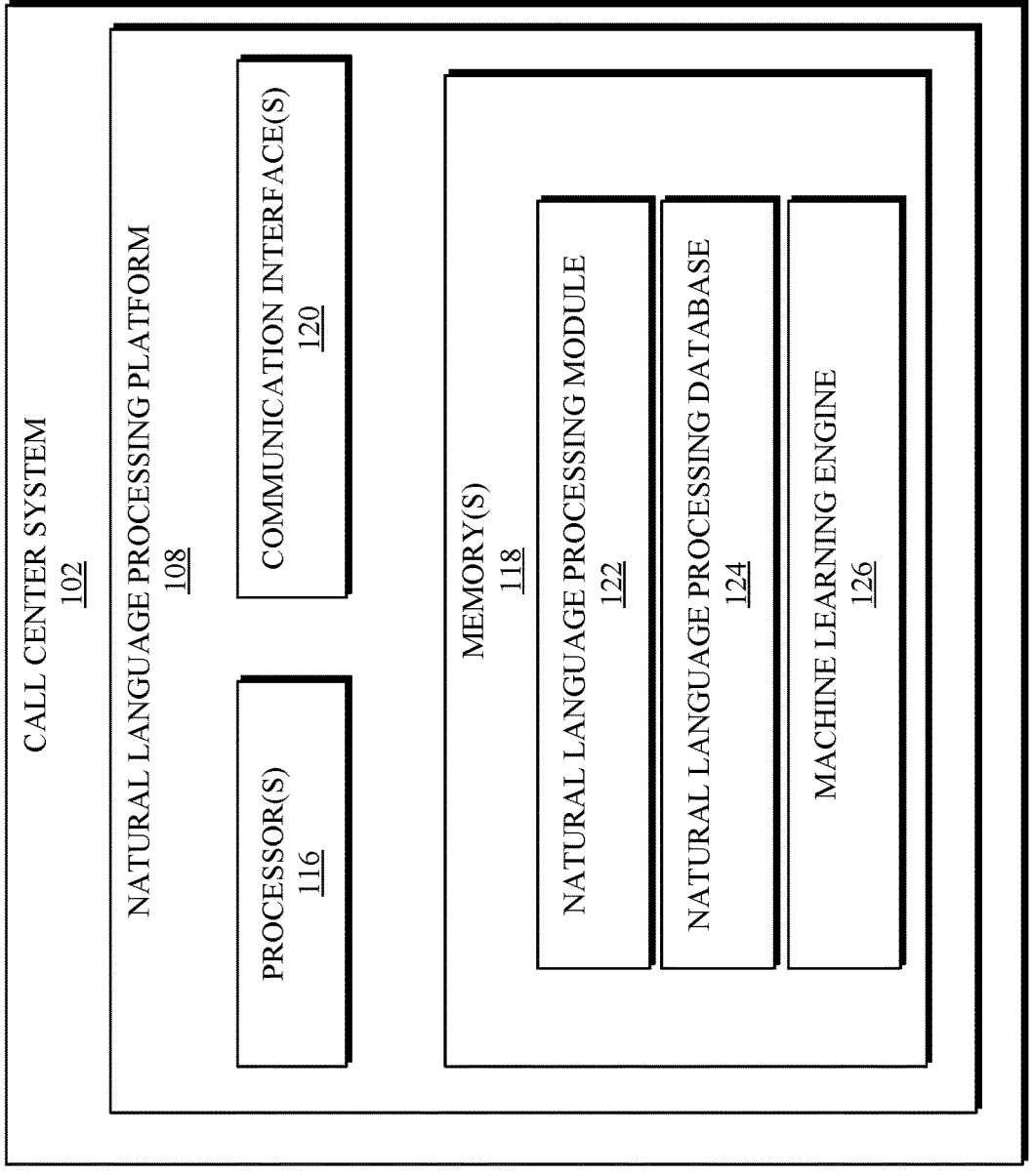
FIG. 2 illustrates an example call center system.

Aspects of the present disclosure involve systems and methods to process a request to provide roadside assistance by performing natural language processing on natural language communication received from a user. The systems and methods described herein use natural language processing to determine an intent of the user for roadside assistance services. The determined intent is used to submit a roadside assistance request. This results in a more user friendly interface without needing the use of a live agent. Additional advantages of the presently disclosed technology will become apparent from the detailed description below.

To begin a detailed description of an example roadside assistance system 100 to for processing a roadside assistance request, reference is made to FIGS. 1-4. The system 100 can include a call center system 102 configured to receive a natural language communication from a user 104 via a telephone device 106. Upon receiving the natural language communication, the call center system 102 can perform natural language processing using a natural language processing platform 108 to determine an intent of the user. The determined intent can be used to submit a roadside assistance request to a roadside service provider system 110. The roadside assistance system 100 can also include a benefit provider system 112 that includes policy and benefit information of the user 106. The call center system 102 is configured to interact with the roadside service provider system 110 and/or the benefit provider system 112 via a network(s) 114.

The call center system 102 includes one or more telephone systems, one or more computing devices (e.g., servers, routers, user interface devices, internet telephony computing device, and the like) that store and/or retrieve data in one or more databases, provide user interfaces, phone system functionality, execute the natural language processing platform 108, etc. by processing instructions. The call center system 102 can be configured to monitor and record (e.g., with appropriate permissions) calls (telephonic, video, voice over internet protocol, or the like) for further analysis. In an implementation, the call center system 102 is configured with one or more microphones to enable recording capabilities. In an implementation, the call center system 102 is configured to record and transmit such recordings to another computing device or database. In an implementation, the call center system 102 is associated with an organization or entity (e.g., an insurance company).

The user 104 is able to communicate using natural language communication to the call center system 102 via one or more interfaces using the telephone device 106. The telephone device 106 can be a computing device (e.g., a desktop computer, laptop computer, tablet computer, vehicle-based devices, a smart watch, or mobile phone) or a landline phone that may be used to communicatively couple with the call center system 102 via a wired and/or wireless link, such as the Internet, a telecommunications network, a cable network, a telephone network, and/or the like.

The natural language processing platform 108 includes one or more processors 116 configured to perform one or more of the functions described herein. For example, the natural language processing platform 108 may include one or more computers (e.g., laptop computers, desktop computers, or servers). In an implementation, the natural language processing platform 108 is configured to perform natural language processing techniques in audio data received via the telephone device 106 to determine an intent of the user 104 (e.g., tire change, lockout, fuel, jump start, and/or tow) to generate and submit a roadside assistance request to a roadside service provider system 110. Additionally, the natural language processing platform 108 may maintain a model for dynamic performance evaluation and training that may be used by the natural language processing platform 108 to analyze the audio data and may be dynamically updated by the natural language processing platform 108 as additional audio and/or performance data are received. In one or more instances, the natural language processing platform 108 may be associated with an organization or entity (e.g., an insurance company, or the like). In an implementation, the model is constructed from previous requests processed by a live agent. The natural language processing platform 108 executing on the call center system 102, and/or other resources connected to the network(s) 114, may access one or more other servers to access other websites, applications, web services interfaces, storage devices, APIs, computing devices, or the like to perform the techniques discussed herein.

The natural language processing platform 108 may further include a memory 118 and communication interface 120. A data bus may interconnect the one or more processors 116, memory 118, and communication interface 120. The com- munication interface 120 may be a network interface con- figured to support communication between the natural lan- guage processing platform 108 and the network(s) 114. The memory 118 may include one or more program modules having instructions that when executed by the one or more processors 116 cause the natural language processing plat- form 108 to perform one or more functions described herein and/or one or more databases that may store and/or other- wise maintain information which may be used by such program modules and/or the one or more processors 116.

In an implementation, the one or more program modules and/or databases may be stored by and/or maintained in different memory units of the natural language processing platform 108 and/or by different computing devices that may form and/or otherwise make up the natural language pro- cessing platform 108. For example, the memory 118 may have, store, and/or include a natural language processing module 122, a natural language processing database 124, and a machine learning engine 126. The natural language processing platform 108 may have instructions that direct and/or cause the natural language processing platform 108 to execute the processing techniques, as discussed in greater detail below. The natural language processing database 124 may store information used by the natural language process- ing module 122 and/or the natural language processing platform 108 in determining the intent, generating and submitting the roadside assistance request, and/or in per- forming other functions. The machine learning engine 126 may have instructions that direct and/or cause the natural language processing platform 108 to determine the intent, generate and submitting the roadside assistance request, provide performance feedback, and to set, define, and/or iteratively refine optimization rules and/or other parameters used by the natural language processing platform 108 and/or other systems in the roadside assistance system 100.

The roadside service provider system 110 includes one or more telephone systems, one or more computing devices (e.g., servers, routers, user interface devices, internet tele- phony computing device, and the like) that store and/or retrieve data in one or more databases, provide user inter- faces, phone system functionality, etc. by processing instruc- tions. The roadside service provider system 110 can assign a service provider (e.g., tow truck) in response to the roadside assistance request received from the natural lan- guage processing platform 108. The assignment can be performed automatically by the one or more computing devices or by an agent. In an implementation, the roadside service provider system 110 can provide status updates regarding the roadside assistance request to the user 104 via the call center system 102 and/or directly through the telephone device 106. For instance, the updates can be through audio, graphical, and/or textual communication.

The benefit provider system 112 is associated with an organization or entity (e.g., an insurance company). The benefit provider system 112 includes one or more telephone systems, one or more computing devices (e.g., servers, routers, user interface devices, internet telephony computing device, and the like) that store and/or retrieve data in one or more databases, provide user interfaces, phone system func- tionality, etc. by processing instructions. The benefit pro- vider system 112 can retrieve and send policy and/or benefit information in response to a lookup request received from the natural language processing platform 108. The policy and/or benefit information indicates what roadside assis- tance services are available to the user 104.

The network(s) 114 can be any combination of one or more of a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, the network(s) 114 can include any type of network, such as the Internet, an intranet, a Virtual Private Network (VPN), a Voice over Internet Protocol (VoIP) network, a wireless network (e.g., Bluetooth), a cellular network, a satellite network, combinations thereof, etc. The network(s) 114 can include communications network components such as, but not limited to gateways routers, servers, and registrars, which enable communication across the network(s) 114. In one implementation, the communications network components include multiple ingress/egress routers, which may have one or more ports, in communication with the network (s) 114.

Figure 3:
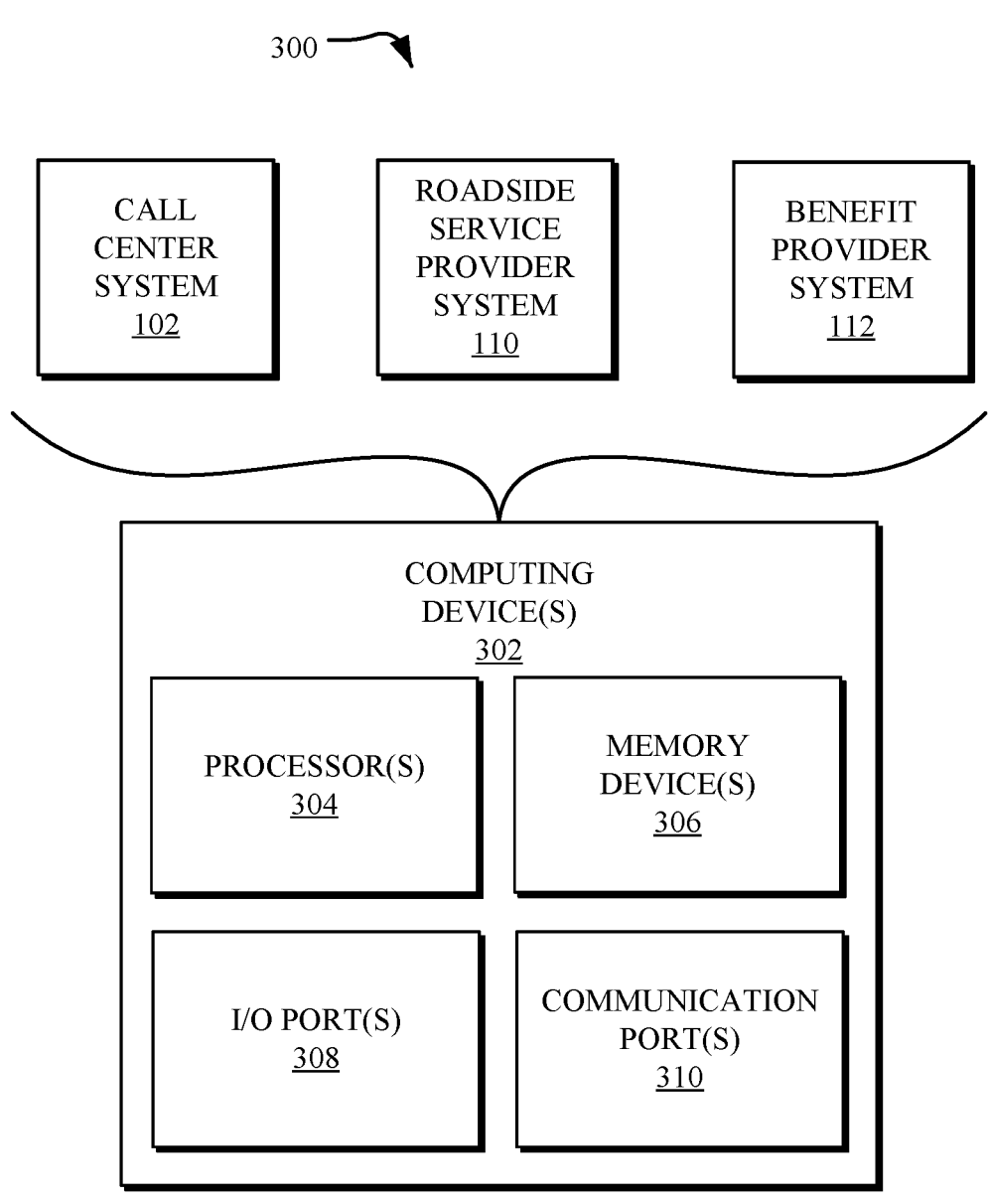
FIG. 3 illustrates an example system to process a request to provide roadside assistance.

Turning to FIG. 3, a system 300 to process a request to provide roadside assistance can include one or more computing device(s) 302 for performing the techniques discussed herein. In one implementation, the one or more computing device(s) 302 include one or more servers of the call center system 102, the roadside service provider system 110, and/or the benefit provider system to generate and execute the natural language processing platform 108 as a software application and/or a module or algorithmic component of software.

In some instances, the computing device(s) 302 can include a computer, a personal computer, a desktop computer, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 302 may be integrated with, form a part of, or otherwise be associated with the systems 100-300. It will be appreciated that specific implementations of these devices may be of differing possible specific computing architectures not all of which are specifically discussed herein but will be understood by those of ordinary skill in the art.

The computing device 302 may be a computing system capable of executing a computer program product to execute a computer process. Data and program files may be input to the computing device 302, which reads the files and executes the programs therein. Some of the elements of the computing device 302 include one or more hardware processors 304, one or more memory devices 306, and/or one or more ports, such as input/output (IO) port(s) 308 and communication port(s) 310. Additionally, other elements that will be recognized by those skilled in the art may be included in the computing device 302 but are not explicitly depicted in FIG. 3 or discussed further herein. Various elements of the computing device 302 may communicate with one another by way of the communication port(s) 310 and/or one or more communication buses, point-to-point communication paths, or other communication means.

The processor 304 may include, for example, a central processing unit (CPU), a microprocessor, a microcontroller, a digital signal processor (DSP), and/or one or more internal levels of cache. There may be one or more processors 304, such that the processor 304 comprises a single central-processing unit, or a plurality of processing units capable of executing instructions and performing operations in parallel with each other, commonly referred to as a parallel processing environment.

The computing device 302 may be a conventional computer, a distributed computer, or any other type of computer, such as one or more external computers made available via a cloud computing architecture. The presently described technology is optionally implemented in software stored on the data storage device(s) such as the memory device(s) 306, and/or communicated via one or more of the I/O port(s) 308 and the communication port(s) 310, thereby transforming the computing device 302 in FIG. 3 to a special purpose machine for implementing the operations described herein. Moreover, the computing device 302, as implemented in the systems 100-300, receives various types of input data (e.g., the natural language communication) and transforms the input data through various stages of the data flow into new types of data files (e.g., the intent) Moreover, these new data files are transformed further into a roadside assistance request and sent to the roadside service provider system 110 to provide a roadside service to the user 104, which enables the computing device 302 to do something it could not do before-generate a roadside assistance request using natural language communication received from the user 104 via the telephone device 106.

Additionally, the systems and operations disclosed herein represent an improvement to the technical field of natural language processing. For instance, natural language processing platform 108 can provide for the usage of natural language communication to generate a roadside assistance request to cause the roadside service provider system 112 to provide roadside assistance to the user 104. Moreover, data can be leveraged from different data sources with varying levels of abstraction to provide a highly customized roadside assistance request. These techniques are rooted in technology and could not have existed prior to the advent of natural language processing and/or machine learning analytics.

The one or more memory device(s) 306 may include any non-volatile data storage device capable of storing data generated or employed within the computing device 302, such as computer executable instructions for performing a computer process, which may include instructions of both application programs and an operating system (OS) that manages the various components of the computing device 302. The memory device(s) 306 may include, without limitation, magnetic disk drives, optical disk drives, solid state drives (SSDs), flash drives, and the like. The memory device(s) 306 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 306 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 306 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 302 includes one or more ports, such as the I/O port(s) 308 and the communication port(s) 310, for communicating with other computing, network, or vehicle computing devices. It will be appreciated that the I/O port 308 and the communication port 310 may be combined or separate and that more or fewer ports may be included in the computing device 302.

The I/O port 308 may be connected to an I/O device, or other device, by which information is input to or output from the computing device 302. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 302 via the I/O port 308. Similarly, the output devices may convert electrical signals received from the computing device 302 via the I/O port 308 into signals that may be sensed as output by a human, such as sound, light, and/or touch. The input device may be an alphanumeric input device, including alphanumeric and other keys for communicating information and/or command selections to the processor 304 via the I/O port 308. The input device may be another type of user input device including, but not limited to direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing device 302 via the I/O port 308. For example, an electrical signal generated within the computing device 302 may be converted to another type of signal, and/or vice-versa. In one implementation, the environment transducer devices sense characteristics or aspects of an environment local to or remote from the computing device 302, such as, light, sound, temperature, pressure, magnetic field, electric field, chemical properties, physical movement, orientation, acceleration, gravity, and/or the like.

In one implementation, the communication port 310 is connected to the network(s) 114 so the computing device 302 can receive network data useful in executing the methods and systems set out herein as well as transmitting information and network configuration changes determined thereby. Stated differently, the communication port 310 connects the computing device 302 to one or more communication interface devices configured to transmit and/or receive information between the computing device 302 and other devices by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 310 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 310 may communicate with an antenna or other link for electromagnetic signal transmission and/or reception.

In an example, the natural language processing platform 108, and/or other software, modules, services, and operations discussed herein may be embodied by instructions stored on the memory devices 306 and executed by the processor 304.

The system set forth in FIG. 3 is but one possible example of a computing device 302 or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 302.

Figure 4:
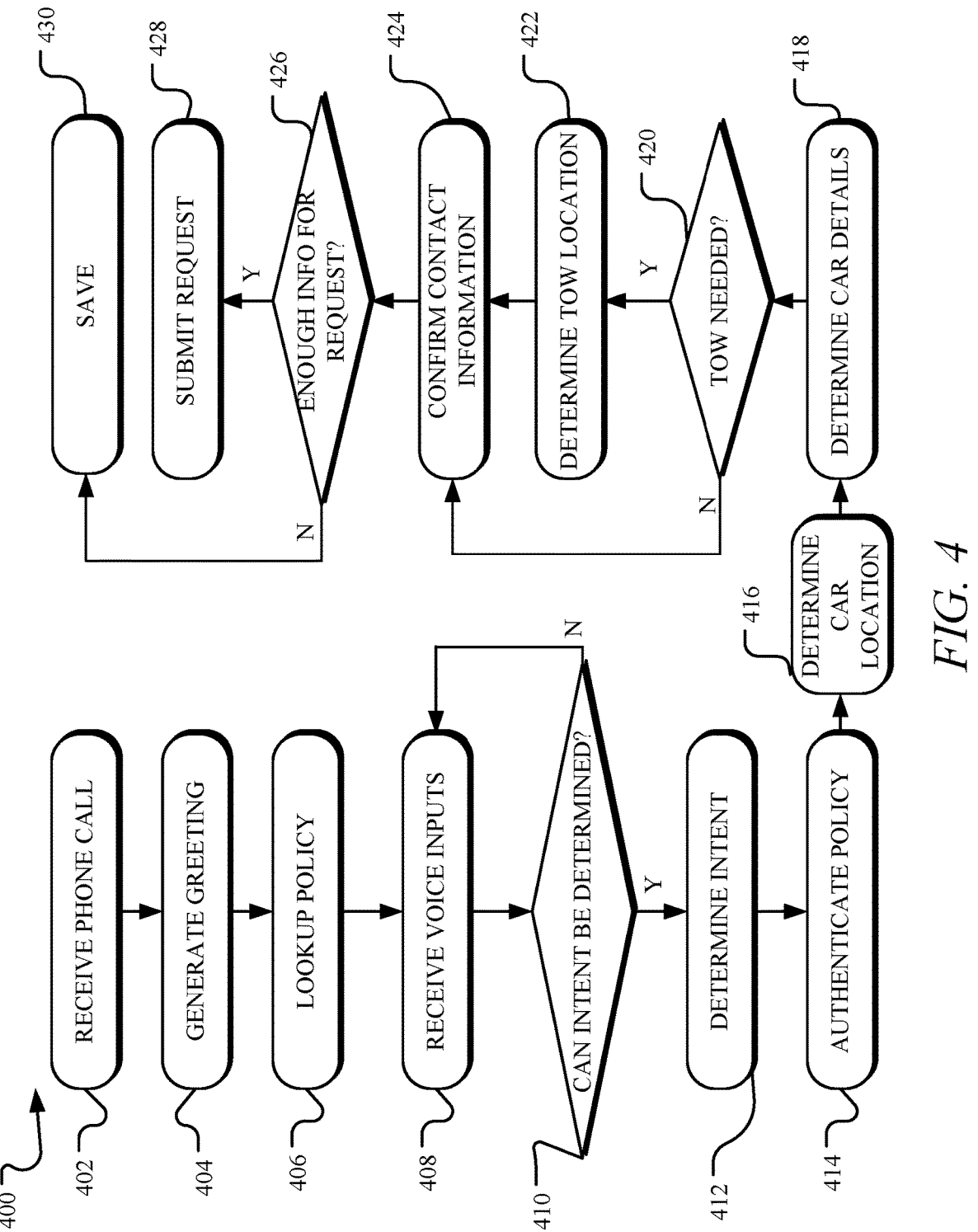
FIG. 4 illustrates an example method to process a request to provide roadside assistance.

FIG. 4 depicts an example method 400 that can be performed by any of the systems 100-300 discussed herein. The method 400 can, in some instances, occur in real time as a call is happening.

At operation 402, the method 400 can receive a phone call via the telephone device 106. At operation 404, the method 400 can generate a greeting that is communicated to the user 104 via the telephone device 106. For instance, the greeting can state, "let me help you get started with your roadside assistance request," "tell me about the problem you are having," etc.

At operation 406, the method 400 can retrieve a policy of the user 104 and/or benefits associated with the policy of the user 104. For instance, the policy and/or benefits may be stored in a database of the call center system 102. If the policy and/or benefits are not stored at the call center system 102, the call center system 102 can generate and send a request to the benefit provider system 112 for the policy and/or benefits. In an implementation, the policy and/or benefits are associated with a phone number of the telephone device 106 that the user 104 is using to communicate with the call center system 102. The call center system 102 can generate an audio output indicating that the policy and/or benefits have or have not been successfully retrieved. In an implementation, if the policy and/or benefits cannot be retrieved using the natural language processing platform 108, the method 400 still can proceed to operation 408.

At operation 408, the method 400 can receive voice inputs from the user 104 via the telephone device 106 in response to the greeting. At operation 410, the method 400 determines if intent can be determined from the received voice inputs. If intent can be determined, the method 400 proceeds to operation 410. If intent cannot be determined, the method 400 generates follow up question(s) to be communicated to the user 104 via the telephone device 106 and reverts to operation 408 to receive additional voice inputs from the user 104 via the telephone device 106 in response to the follow up question(s). This cycle is repeated until the intent can be determined. For instance, the natural language processing platform 108 can generate questions such as, "do you need a jump start?", "which do you need, a jump start or a tow?", "which do you need: a tire change or a tow?", "do you need your vehicle towed?", "do you need a tire changed?", and/or "do you need fuel delivered to you?". If the intent cannot be determined after a predetermined number of attempts, the method 400 can proceed to operation 414 or the call can be transferred to a live agent associated with the call center system 102.

At operation 412, the method 400 can determine the intent (e.g., tire change, lock out, fuel, jump start, and/or tow) using the received voice inputs. The natural language processing platform 108 can apply a model (e.g., a neural network model, machine learning algorithms, etc.) based on previously processed roadside assistance requests by a live agent and/or the natural language processing platform 108. In an implementation, the natural language processing platform 108 can update the model based on success or failure of successfully determining the intent of the user 104. In an implementation, the natural language processing platform 108 generates follow up question(s) to be communicated with the user 104 via the telephone device 106. For instance, if the user 104 indicates that a jump start is needed, the natural language processing platform 108 generates a question to determine if a tow will also be needed. In this implementation, the natural language processing platform 108 generates a question such as, "did your vehicle stop while driving?" If the user 104 responds with "yes", the natural language processing platform 108 determines that a tow will be needed. If the user 104 indicates that a tire change is needed, the natural language processing platform 108 generates a question to determine if a tow will also be needed. In this implementation, the natural language processing platform 108 generates a question such as, "did you only have one flat tire, and do you have a spare?" If the user 104 responds with "no", the natural language processing platform 108 determines that a tow will be needed. If the user 104 indicates that fuel is needed, the natural language processing platform 108 generates a question to determine what type of fuel needs to be delivered. In this implementation, the natural language processing platform 108 generates a question such as, "which type of fuel do you need?". If the user 104 indicates a lockout, the natural language processing platform 108 generates a question to determine if a tow is needed. In this implementation, the natural language processing platform 108 generates a question such as, "are the keys in the trunk?". If the user responds with "no", the natural language processing platform 108 determines that a tow will be needed. If the user responds with "yes", the natural language processing platform 108 generates a question such as, "is the trunk accessible from the cabin?". If the user responds with "no", the natural language processing platform 108 determines that a tow will be needed.

At operation 414, the method 400 can authenticate the policy. For instance, the natural language processing platform 108 generates questions to be communicated to the user 104 via the telephone device 106 asking for the membership and/or policy number. If the user 104 is unable to provide this information, the method 400 can proceed to operation 416 or the call can be transferred to a live agent that can authenticate the policy.

At operation 418, the method 400 can determine a car location. For instance, the natural language processing platform 108 generates questions to be communicated to the user 104 via the telephone device 106 asking for a location of the car (e.g., address, latitude and longitude, etc.). In an implantation, if the user 104 indicates that the car is located at an address associated with the policy, the natural language processing platform 108 can retrieve the address from a database associated with the call center system 102 or the benefit provider system 112. In another implementation, if the location is in an unsafe location, the natural language processing platform 108 can communicate with an emergency dispatch to cause emergency personal to the location.

At operation 418, the method 400 can determine car details (e.g., year, model, make, and color of a car associated with the roadside assistance request). In an implementation, the car details are associated with the policy and can be retrieved from a car details database. The car details database can be part of the benefit provider system 112, the call center system 102, or other third party systems. In an implementation where the policy is associated with multiple cars, the natural language processing platform 108 generates questions asking about the car details (e.g., year, model, make, and/or color of the car).

At operation 420, the method 400 can determine if a tow is needed based on the received audio input from the user 104 via the telephone device 106. If a tow is needed, the method 400 proceeds to operation 422. If a tow is not needed, the method 400 proceeds to operation 424.

At operation 422, the method 400 determines a tow location. For instance, the tow location can be a latitude and longitude and/or an address associated with a business (e.g., car repair shop). In an implementation, the natural language processing platform 108 generates a question asking if the tow location is acceptable (e.g., Company X-garage). If the user 104 indicates that the tow location is acceptable, the method 400 proceeds to operation 424. If the user 104 indicates that the tow location is not acceptable, the natural language processing platform 108 generates additional questions for additional tow locations (e.g., Company Y garage, Company Z garage, etc.). If no locations are acceptable, the call may be transferred to a live agent.

At operation 424, the method 400 confirms contact information of the user 104. For instance, the natural language processing platform 108 generates questions asking a name, phone number, etc. of the user 104. In an implantation, a contact database associated with the call center system 102 or the benefit provider system 112 is updated based on the received response(s) from the user 104.

At operation 426, the method 400 determines if enough information has been received to submit the roadside assistance request. If the method 400 determines that enough information has been collected, the method 400 proceeds to operation 428. At operation 428, the method 400 generates and sends the roadside assistance request to the roadside service provider system 110 via network(s) 114. In response to receiving the roadside assistance request, the roadside service provider system 110 allocates resources to respond to the request (e.g., tow truck, repair technician, etc.). If the method 400 determines that not enough information has been collected, the method 400 proceeds to operation 430. At operation 430, the method 400 saves the collected information to the memory 118 and transfers the call to a live agent.

It is to be understood that the specific order or hierarchy of operations in the methods depicted in FIG. 4 and throughout this disclosure are instances of example approaches and can be rearranged while remaining within the disclosed subject matter. For instance, any of the operations depicted in FIG. 4 may be omitted, repeated, performed in parallel, performed in a different order, and/or combined with any other of the operations depicted in FIG. 4 or discussed herein.

Furthermore, any term of degree such as, but not limited to, "substantially," as used in the description and the appended claims, should be understood to include an exact, or a similar, but not exact configuration. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A computer implemented method comprising:
receiving a phone call from a telephone device;
generating a greeting for communication to a user via the telephone device;
retrieving one or more of a policy and benefits associated with the user;
receiving voice inputs from the user via the telephone device while maintaining a voice connection with the telephone device during a submission of a roadside assistance request, wherein the submission of the roadside assistance request includes:
determining intent based on the voice inputs; and
determining a car location based on the voice inputs;
determining whether collected information during the submission of the roadside assistance request is sufficient, wherein:
when the collected information is not sufficient, transfer the phone call to a live agent while maintaining the voice connection, and
when the collected information is sufficient, submit the roadside assistance request to a benefit provider system to cause roadside assistance to be provided to the user.
2. The method of claim 1, wherein retrieving one or more of a policy and benefits associated with the user includes receiving the one or more of the policy and benefits from a benefit provider system.
3. The method of claim 1, wherein the voice inputs are natural language.

4. The method of claim 1, wherein the telephone device is one or more of a desktop computer, laptop computer, tablet computer, vehicle-based devices, a smart watch, mobile phone, and a landline phone.
5. The method of claim 1, wherein when intent cannot be determined from the voice inputs, the method further comprising:
generating one or more follow up questions; and
receiving additional voice inputs in response to the one or more follow up questions.
6. The method of claim 1, further comprising authenticating the policy.
7. The method of claim 1, further comprising determining car details, wherein the car details are determined based on one or more of the voice inputs and the policy.
8. The method of claim 1, further comprising:
determining whether a tow is needed based on the voice inputs; and
determining a tow location.
9. The method of claim 1, further comprising confirming contact information of the user.
10. A call center system comprising:
a natural language processing platform comprising one or more processors configured to:
receive a phone call from a telephone device;
generate a greeting for communication to a user via the telephone device;
retrieve one or more of a policy and benefits associated with the user;
receive voice inputs from the user via the telephone device while maintaining a voice connection with the telephone device during a submission of a roadside assistance request, wherein the submission of the roadside assistance request includes:
determine intent based on the voice inputs; and
determine a car location based on the voice inputs;
determine whether collected information during the submission of the roadside assistance request is sufficient, wherein:
when the collected information is not sufficient, transfer the phone call to a live agent associated with a call center system while maintaining the voice connection, and
when the collected information is sufficient, submit the roadside assistance request to a benefit provider system to cause roadside assistance to be provided to the user.
11. The call center system of claim 10, wherein when intent cannot be determined from the voice inputs, the one or more processors is further configured to:
generate one or more follow up questions; and
receive additional voice inputs in response to the one or more follow up questions.
12. The call center system of claim 10, wherein the one or more processors is further configured to authenticate the policy.
13. The call center system of claim 10, wherein the one or more processors is further configured to determine car details based on one or more of the voice inputs and the policy.
14. The call center system of claim 10, wherein the one or more processors is further configured to:
determine whether a tow is needed based on the voice inputs; and
determine a tow location.

15. The call center system of claim 10, wherein the one or more processors is further configured to confirm contact information of the user.

16. The call center system of claim 10, wherein the telephone device is one or more of a desktop computer, a laptop computer, tablet computer, vehicle-based devices, a smart watch, mobile phone, and a landline phone.

17. One or more tangible non-transitory computer-readable storage media storing computer-executable instructions for performing a computer process on a computing system, the computer process comprising:

receiving a phone call from a telephone device;

generating a greeting for communication to a user via the telephone device;

retrieving one or more of a policy and benefits associated with the user;

receiving voice inputs from the user via the telephone device while maintaining a voice connection with the telephone device during a submission of a roadside assistance request, wherein the submission of the roadside assistance request includes:

determining intent based on the voice inputs;

determining a car location based on the voice inputs;

determining car details based on one or more of the voice inputs and the policy;

determining whether a tow is needed based on the voice inputs;

determining a tow location when the tow is needed;

determining whether collected information during the submission of the roadside assistance request is sufficient, wherein:

when the collected information is not sufficient, transfer the phone call to a live agent while maintaining the voice connection, and when the collected information is sufficient, submit the roadside assistance request to a benefit provider system to cause roadside assistance to be provided to the user.

18. The one or more tangible non-transitory computer-readable storage media storing computer-executable instructions for performing the computer process on the computing system of claim 17, wherein the computer process further comprises confirming contact information of the user.

19. The one or more tangible non-transitory computer-readable storage media storing computer-executable instructions for performing the computer process on the computing system of claim 17, wherein the computer process further comprises authenticating the policy.

20. The one or more tangible non-transitory computer-readable storage media storing computer-executable instructions for performing the computer process on the computing system of claim 17, wherein when intent cannot be determined from the voice inputs, the computer process further comprises:

generating one or more follow up questions; and receiving additional voice inputs in response to the one or more follow up questions.

* * * * *